United States Patent [19]

Kenpo et al.

[11] Patent Number: 5,084,336
[45] Date of Patent: Jan. 28, 1992

[54] MAGNETIC RECORDING MEDIUM

[75] Inventors: Tsutomu Kenpo; Takafumi Yanagita, both of Hino, Japan

[73] Assignee: Konica Corporation, Tokyo, Japan

[21] Appl. No.: 290,184

[22] Filed: Dec. 22, 1988

[30] Foreign Application Priority Data

Dec. 28, 1987 [JP] Japan .................................. 62-333921

[51] Int. Cl.⁵ ............................................. G11B 23/00
[52] U.S. Cl. ................................... 428/323; 427/131; 428/329; 428/408; 428/425.9; 428/694; 428/900
[58] Field of Search ..................... 428/323, 329, 425.9, 428/408, 694, 900; 427/131

[56] References Cited

U.S. PATENT DOCUMENTS

| | | | |
|---|---|---|---|
| 4,419,406 | 12/1983 | Isobe et al. | 428/694 |
| 4,555,443 | 11/1985 | Kikagawa et al. | 428/694 |
| 4,612,235 | 9/1986 | Ushimaru et al. | 428/694 |
| 4,634,633 | 1/1987 | Ninomiya et al. | 428/694 |
| 4,686,139 | 8/1987 | Ryoke et al. | 428/694 |
| 4,734,325 | 3/1988 | Ryoke et al. | 428/694 |
| 4,871,606 | 10/1989 | Matsuura et al. | 428/694 |

OTHER PUBLICATIONS

Patent Abstracts of Japan, vol. 10, No. 195 (p. 475)(2251) 7/9/86, p. 127 P 475; JPA-61-39227.
Patent Abstracts of Japan, vol. 10, No. 195 (p. 475)(2251) 7/9/86, p. 126 p475; JPA-61-39224.
Patent Abstracts of Japan, vol. 10, No. 74 (p. 439)(2131) 3/25/86, pp. 20,21 P 439; JPA-60-211623.

*Primary Examiner*—Paul J. Thibodeau
*Attorney, Agent, or Firm*—Jordan B. Bierman

[57] ABSTRACT

The method of improving a magnetic recording medium having a support, provided thereon a magnetic layer, and provided on an another side of the support a back coating layer, is disclosed. The improvement comprises the back coating layer containing a binder and a non-magnetic powder comprising essentially of a combination of carbon black and a non-magnetic particle selected from the group consisting of zinc oxide, titanium oxide, barium sulfate, ferric oxide and calcium carbonate.

32 Claims, No Drawings

MAGNETIC RECORDING MEDIUM

FIELD OF THE INVENTION

The present invention relates to a magnetic recording medium, specifically to the improvement of the surface properties of a back coating layer.

BACKGROUND OF THE INVENTION

Magnetic recording media, such as magnetic tapes, magnetic sheets and magnetic disks, are widely used in the fields of audio, video and computers. Referring to magnetic tapes used in a video field, when recording or reproducing an image with a magnetic tape loaded in a cassette, the cassette is mounted on a video deck and the tape is scanned by a magnetic head while traveling along guide poles and rollers. Traveling and rewinding of the tape for recording and reproducing have to be stable and constant in repeated use. Usually, the tape travels at a high speed and contacts guide poles etc. Therefore, the surface of the tape, which is usually made of a material with high electrical resistance, has to provide the properties suitable for high speed traveling including an anti-electrostatic effect.

In addition, magnetic layer surface is finished smooth so that contact of a magnetic tape with a magnetic head is kept constant for gaining higher sensitivity, especially higher output at a high frequency range. However, extremely smooth magnetic layer surface is liable to cause problems in tape traveling due to increasing dynamic friction resistance.

Furthermore, in traveling in a video deck, a back side of a magnetic tape as well as a right side contacts the guide poles and rolls and therefore, the back side with poor traveling property and durability will result in having excessive tension exerted on the traveling tape and thus having the magnetic layer excessively rubbed by a magnetic head, which in turn causes not only magnetic layer damages and magnetic powder dropping from the magnetic layer, but also fluctuation of tape winding tension intensity and leads to irregular edges of a wound tape and then to irregular tape traveling in reproducing. These faults will degrade image or electromagnetic properties such as skew, jitter and S/N.

To solve these problems, it has been suggested that a back coating layer is formed on a back side of a magnetic tape.

As an example, a magnetic tape having on a back side a back coating layer containing inorganic powder can reduce contact area with guide poles etc. by irregular surface of the back coating layer, whereby friction coefficient is lowered. For example, Japanese Patent Publication Open to Public Inspection Nos. 130234/1982, 161135/1983, 53825/1982 and 2415/1983 disclose the examples of the back coating layers incorporating inorganic powder, and most of these examples specify particle sizes.

The back coating layers incorporating carbon black in place of inorganic powder are described in Japanese Patent Examined Publication No. 17401/1977. The back coating layers containing carbon black aim at obtaining an anti-electrifying effect attributable to electroconductivity of carbon black, a light-shielding effect and an irregularity effect. In this case, however, carbon black having a average particle size of 10 to 20 m$\mu$ is extremely poor in dispersibility in paint due to flocculated particles; therefore, the back coating layer prepared by such coating solution is likely to form thereon excessive irregularities caused by flocculated particles and drop out due to rather low adhesion of these flocculated particles with a binder, and such excessive irregularities tend to be transferred onto a magnetic layer when the tape is wound.

As stated above, carbon black with fine particle size is difficult to disperse equally so as to form uniform irregularities on a back coating layer, and is liable to form irregularities on a magnetic layer due to excessive irregularities on the back coating layer.

It has also been attempted to use carbon black with a relatively small average primary particle size of 10 to 60 $\mu$m, and with an another average primary particle size of not less than 100 $\mu$m in combination to reduce a friction resistance of a back coating layer (e.g. Japanese Patent Publication Open to Public Inspection Nos. 45938/1985, 45939/1985, 25023/1985, 38725/1985, 107729/1985, 185027/1984, 223937/1984, 111828/1982, 147308/1975). However, no sufficient improvement of traveling property and durability can be achieved by such combination use based simply on different particle sizes of carbon black.

SUMMARY OF THE INVENTION

In the light of the preceding background, the object of the present invention is to provide a magnetic recording medium having a lower dynamic friction coefficient and less deck tension of a tape in travelling which enables to provide no tape damages in repeated use and therefore, excellent electromagnetic conversion properties such as chroma S/N.

The preceding object of the present invention is accomplished by means of a magnetic recording medium comprising a support, providing thereon, a magnetic layer and provided on the other side a back coating layer containing a binder and nonmagnetic powder, wherein:

(1) said back coating layer contains carbon black with an average primary particle size of 20 to 40 m$\mu$ and zinc oxide with an average particle size of 0.5 to 2.0 $\mu$m, (2) said back coating layer contains carbon blacks with the average primary particle sizes of 20 to 40 m$\mu$ and 100 to 500 m$\mu$ and zinc oxide with an average particle size of 0.5 to 2.0 $\mu$m, (3) said back coating layer contains carbon blacks with the average primary particle sizes of 20 to 40 m$\mu$ and 100 to 500 m$\mu$, zinc oxide with an average particle size of 0.5 to 1.0 $\mu$m, and at least one of titanium oxide, barium sulfate, iron oxide and calcium carbonate with an average particle size of 0.01 to 1.0 $\mu$m, or (4) said back coating layer contains carbon blacks with the average primary particle sizes of 20 to 40 m$\mu$, 50 to 80 m$\mu$, and 100 to 500 m$\mu$, and zinc oxide with an average particle size of 0.5 to 2.0 $\mu$m.

DETAILED DESCRIPTION OF THE INVENTION

The present invention will now be described in detail.

The examples of the preceding carbon black (A) with an average primary particle size of 20 to 40 m$\mu$ are; Raven 5250, 1255, 1250, 1200, 1170, 1040, 1035, 1030, 1020, 890, 850, 825, produced by Columbia Carbon Co.; Black Pearls L, Regal 400, 600, 500R, 500, 330, 99, Valcan XC-72, P, produced by Cabot Co.; CF9, #50, 52, 45, 44, 32, 30, 4000, MA-100, 7, 8, 11, produced by Mitsubishi Chemical Industries Ltd.

The examples of carbon black (B) with an average primary particle size of 50 to 80 m$\mu$ are; Raven 500, 450 430, 420, 410, H20, 22, 16, 14, produced by Columbia Carbon Co.; Regal SRF-S, Sterling V, Sterling NS, produced by Cabot Co.; CF9, #2350, #2300, #1000, #950, #900, #850, MA7, MA8, #33, CF9, #5B, produced by Mitsubishi Chemical Industries Ltd.

The example of carbon black (C) with an average primary particle size of 100 to 500 m$\mu$ is Raven MT-CI (350 m$\mu$), produced by Columbia Carbon Co. The respective contents of the foregoing carbon blacks (A), (B) and (C) with different particle sizes are 10 to 90 wt%, 1 to 50 wt% and 1 to 40 wt%, preferably 20 to 80 wt%, 5 to 50 wt% and 5 to 40 wt% of the total carbon weight.

Zinc oxide used in the present invention may be produced by either of a dry method and a wet method, but non-monomorphic zinc oxide produced by a French method is preferable.

A particle size of zinc oxide is represented by a value determined by an air permeability method described below.

The air permeability method generally uses a Kozeny-Carman's equation (1) shown below, to determine an average particle size of powder comprising spherical uniform particles as a function of permeability of a fluid (air) permeating a powder filled bed and specific surface area of powder.

$$S_w = \frac{14}{\rho} \sqrt{\frac{\Delta P A t}{\eta L Q}} \frac{\epsilon^3}{(1 - \epsilon)^2} \quad (1)$$

$$\epsilon = 1 - \frac{W}{\rho A L}$$

wherein,
$S_w$: specific surface area of powder (cm$^2$/g)
$\epsilon$: porosity of a powder filled bed
$\rho$: powder density (g/cm$^3$)
$\eta$: viscosity coefficient of air (g/cm·sec.)
L: thickness of a powder filled bed (cm)
Q: amount of air permeating a powder filled bed (c.c.)
$\Delta P$: pressure difference between the opposite sides of a powder filled bed (g/cm$^2$)
A: sectional area of a powder filled bed (cm$^2$)
t: time taken for Q cc of air to permeate a powder filled bed (sec.)
W: powder weight (g)

In the above equation (1), $\rho$, $\eta$, L, A, and $\epsilon$ can be independently measured; therefore, $S_w$ can be determined by measuring $\Delta P$ corresponding to Q and t identified separately. The determined value of $S_w$ is inserted in an equation (2) below to calculate an average particle size dm.

$$dm = \frac{6}{\rho S_w} \quad (2)$$

Measuring apparatuses which can be used include SS-100 made by Shimadzu Corporation.

In the composition of a back coating paint of the present invention, the ratio of the zinc oxide to carbon black is 0.01 to 2.0, preferably 0.05 to 1.0. The addition of the total filler including carbon black and zinc oxide is 50 to 500 parts by weight, preferably 60 to 400 parts by weight per 100 parts by weight of a binder.

As a binder, all of the various resins which have conventionally been used in magnetic tapes can be used; the particularly preferable binder is a mixture of polyurethane resin and cellulose resin containing polyisocyanate. There may also be added various additives which have conventionally been used to improve physical properties, electromagnetic conversion properties and productivity.

The organic fillers which are preferably used in combination with carbon black and zinc oxide are acrylstyrene resin, benzoguanamine resin powder, melamine resin powder, phthalocyanine pigment, polyolefin resin powder, polyester resin powder, polyamide resin powder, polyimide resin powder, polyethylene fluoride resin powder etc.

It is preferable to use benzoguanamine and/or melamine resin powder in combination with carbon black.

The examples of an inorganic powder include silicon oxide, titanium oxide, aluminum oxide, calcium carbonate, barium carbonate, barium sulfate, calcium sulfate, zinc sulfate, tinoxide, cromium oxide, silicon carbide calcium carbide, $\alpha$-Fe$_2$O$_3$, talc, kaolin, boron nitride, zinc fluoride, and molybdenum dioxide.

Polyurethane resin used for a back coating layer of the invention, which is synthesized by reaction of polyol and polyisocyanate, may have an ether linkage, an ester linkage a carbonic acid ester linkage, or a combination of two or more of these linkages, as well as an urethane linkage, in a main polyurethane chain, by selecting polyols. Furthermore, fluorine, silicon or a sulfon group may be introduced into a main and/or side chain to improve lubricity and dispersibility.

An average molecular weight of the polyurethane resin is preferably 500 to 200,000.

The examples of a cellulose resin used in the present invention include cellulose ethers, inorganic and organic acid esters of cellulose and etc. The examples of cellulose ether include methyl cellulose, ethyl cellulose, propyl cellulose, butyl cellulose, methyl ethyl cellulose, methyl hydroxyethyl cellulose, carboxymethyl cellulose, and hydroxyethyl cellulose. The examples of inorganic acid ester of cellulose include nitrocellulose, cellulose sulfate, and cellulose phosphate. The examples of organic acid ester of cellulose include acetyl cellulose, propionyl cellulose, and butyryl cellulose. Of these cellulose resins, nitrocellulose is particularly preferable.

The blending ratio by weight of polyurethane resin to cellulose resin is 0.05 to 10.0, preferably 0.1 to 5.0.

Cellulose resin, particularly nitrocellulose used in the present invention, contributes to improvement of heat resistance, toughness and anti-block property, and provides noticeable preventive effect on interlayer adhesion attributable to smaller friction coefficient, which results in improving traveling stability especially at higher temperature and humidity.

From the viewpoint of productivity, paint containing nitrocellulose is preferable to that containing vinyl chloride, since it ensures more rapid dispersion and no recoagulation of a filler, and the paint itself becomes more stable.

In the present invention, polyisocyanate is added to a binder as a curing agent.

The examples of aromatic polyisocyanate used in the invention include tolylene diisocyanate (TDI) and an adduct of an active hydrogen compound and polyisocyanate; polyisocyanates with a molecular weight of 100 to 3,000 are preferred.

The examples of aliphatic polyisocyanate include hexamethylene diisocyanate (HMDI) and an adduct of an active hydrogen compound and isocyanate. Of them, isocyanates with a molecular weight of 100 to 3,000 are preferred. Of the aliphatic polyisocyanates, non-alicyclic polyisocyanate and an adduct thereof with an active hydrogen compound are particularly preferable.

The amount of the polyisocyanate added is 1/20 to 7/10, preferably 1/10 to ½ of a binder by weight.

From the viewpoint of traveling and electromagnetic conversion properties, it is preferable that a surface roughness of a back coating layer in the present invention is not more than 0.05 μm, as expressed by an average roughness (Ra) on a center line with a 0.08 mm cut-off.

The examples of dispersants used for a back coating layer in the invention include lecithin, phosphoric ester, amine compound, alkyl sulfate, fatty acid amide, higher alcohol, polyethylene oxide, sulfosuccinic acid, sulfosuccinic ester, known surfactant, and salts thereof; salts of polymer dispersants having organic acid group (e.g. —COOH, —$PO_3H$) can also be used. These dispersants are added at a ratio of 1 to 20 parts by weight per 100 parts by weight of a binder.

The examples of antistatic agents used in the invention include powder of electroconductive substances such as carbon black, graphite, tin oxide-antimony oxide compounds, and titanium oxide-tin oxide-antimony oxide compounds; natural surfactants such as saponin; nonionic surfactants such as alkylene oxide, glycerol and glycidol compounds; cationic surfactants such as higher alkyl amine, quaternary ammonium salts, pyridine and other heterocycles, phosphoniums and sulfoniums; anionic surfactants containing acidic groups such as carboxylic acid, sulfonic acid, phosphoric acid, sulphuric ester, and phosphoric ester; amphoteric surfactants such as amino acids, aminosulfonic acid, and sulfuric or phosphoric esters of aminoalcohols.

It should be noted that the present invention is unique in that none of the conventional lubricants is employed. Such conventional lubricants increase a friction coefficient and then a torque, which in turn causes abnormal traveling and thus reduces traveling durability.

The back coating paint having the preceding composition is coated to dry thickness of 0.1 to 2.0 μm, preferably 0.2 to 1.5 μm.

The magnetic layer of the present invention may be a coating type magnetic layer comprising magnetic powder, a binder, a dispersant, a lubricant etc., or may be a thin film type magnetic layer formed by a vapor deposition method, a sputtering method, or other method.

The examples of a magnetic material include magnetic oxides such as $\gamma$-$Fe_2O_3$, Co-containing $\gamma$-$Fe_2O_3$, Co-depositing $\gamma$-$Fe_2O_3$, $Fe_3O_4$, Co-containing $Fe_3O_4$, Co-depositing $Fe_3O_4$, and $CrO_2$; magnetic metal powders composed mainly of Fe, Ni, Co, and Al such as Fe, Ni, Co, Fe-Ni alloys, Fe-Co alloys, Fe-Al alloys, Fe-Al-Ni alloys, Fe-Ni-P alloys, Fe-Ni-Co alloys, Fe-Mn-Zn alloys, Fe-Ni-Zn alloys, Fe-Co-Ni-Cr alloys, Fe-Co-Ni-P alloys, Co-Ni alloys, Co-P alloys, and Co-Cr alloys; and other various ferromagnetic substances. These magnetic metals may contain elements such as Si, Cu, Zn, Al, P, Mn, and Cr, or compounds thereof.

Hexagonal system ferrites such as barium ferrite, and iron nitride can also be used.

The same binders, curing agents, dispersants, antistatic agents and fillers as used for the back coating layer can be used also for the magnetic layer. Conventional lubricants can also be used.

Furthermore, abrasives can be added if necessary. The examples of abrasives include conventional abrasives such as fused alumina, silicon carbide, chromium oxide, corundum, artificial corundum, artificial diamond, garnet, and emerry (main ingredients: corundum and magnetite). These abrasives have an average particle size of 0.05 to 5 μm, preferably 0.1 to 2 μm. These abrasives are added at a ratio of 1 to 20 parts by weight per 100 parts by weight of the magnetic powder.

The examples of solvent used for the preceding back coat and magnetic paint or used for diluting coating paint include ketones such as acetone, methyl ethyl ketone and cyclohexanone; alcohols such as methanol and ethanol; esters such as methyl acetate, ethyl acetate and butyl acetate; ethers such as glycoldimethylether and tetrahydrofuran; aromatic hydrocarbons such as benzene, toluene and xylene; and hallogenated hydrocarbon such as methylene chloride, carbon tetrachloride and chloroform.

The examples of a support used in the invention include polyesters such as polyethylene terephthalate and polyethylene-2,6-naphthalate; polyolefins such as polypropylene; cellulose derivatives such as cellulose triacetate and cellulose diacetate; and plastics such as polyamide and polycarbonate. Metals such as Cu, Al and Zn, glass, boron nitride, silicone-carbide, ceramics etc. can also be used.

The thickness of these supports is about 3 to 100 μm, preferably 5 to 50 μm for film or sheet, and 30 μm to 10 mm for disk and card. When the support is a drum, it is used in a cylinder form and its shape depends a type of a recorder used.

An interlayer may be inserted between a support and a back coating layer or magnetic layer in order to improve adhesion.

Coating methods applicable to form layers on a support include air doctor coating, blade coating, air knife coating, squeeze coating, impregnation coating, reverse roll coating, transfer roll coating, gravure coating, kiss coating, cast coating, and spray coating.

EXAMPLES

The present invention will be described in more detail as follows.

EXAMPLES 1 TO 6 AND COMPARISONS 1 to 4

A magnetic paint with composition I shown below was sufficiently mixed and dispersed in a ball mill, and 6 parts of polyfunctional isocyanate was added as a curing agent. This paint was then filtered through 1 μm-filter and coated on a polyethylene terephthalate support of 13 μm thickness by a reverse roll coater to form a magnetic layer having dry thickness of 4.5 μm, which was then subjected to supercalender treatment.

The compositions (back coating paints) shown in Table 1 were dispersed in a ball mill for 24 hours and then used as back coating paints for respective samples. Each of the paints was coated on a back side of preceding support by a reverse roll coater and dried to form a back coating layer having dry thickness of 1.0 μm, which was then slit to a width of ½ inch to get the tape samples of Examples 1 to 6 and Comparisons 1 to 4.

| Composition I (magnetic paint) | (parts by weight) |
|---|---|
| Co-containing $\gamma$-$Fe_2O_3$ | 100 |
| Polyurethane | 8 |
| Vinyl chloride-vinyl acetate copolymer | 12 |
| Butyl stearate | 0.8 |
| Myristic acid | 0.5 |
| Stearic acid | 0.5 |

-continued

| Composition I (magnetic paint) | (parts by weight) |
|---|---|
| Alumina | 5 |
| Carbon black | 0.5 |
| Lecithin | 4 |
| Cyclohexanone | 40 |
| Methyl ethyl ketone | 60 |
| Toluene | 60 | was wound around a stainless steel pin of a 3.8 mm diameter at an angle of 180° and the measurement was performed at 23° C. and RH 60% by a travelling tester made by Yokohama System Co. with an inlet tension set at 20 g.

$$\mu = \frac{1}{\pi} \ln \left( \frac{\text{outlet tension}}{\text{inlet tension}} \right) \qquad (2)$$

TABLE 1

Composition (back coating paint) (unit: parts by weight)

| Composition | Example | | | | | | Comparison | | | |
|---|---|---|---|---|---|---|---|---|---|---|
|  | 1 | 2 | 3 | 4 | 5 | 6 | 1 | 2 | 3 | 4 |
| Polyurethane resin (Nipporan 2304, produced by Nippon Polyurethane Industry Co., Ltd.) | 40 | 40 | 50 | 50 | 20 | 35 | 40 | 40 | 50 | 50 |
| Nitrocellulose (Cellunova, produced by Asahi Chemical Industry Co., Ltd.) | 60 | 60 | 50 | 50 | 35 | 20 | 60 | 60 | 50 | 50 |
| Polyisocyanate (Coronate L, produced by Nippon Polyurethane Industry Co., Ltd.) | 20 | 20 | 20 | 20 | 15 | 15 | 20 | 20 | 20 | 20 |
| Carbon black |  |  |  |  |  |  |  |  |  |  |
| A | 95 | — | 110 | — | — | 65 | — | — | 80 | — |
| B | — | 105 | — | 80 | — | — | — | — | — | 110 |
| C | — | — | — | — | 70 | — | — | — | — | — |
| D | — | — | — | — | — | — | — | 110 | — | — |
| E | — | — | — | — | — | — | 100 | — | — | — |
| Zinc oxide |  |  |  |  |  |  |  |  |  |  |
| a | 25 | — | 10 | — | 15 | — | 20 | — | — | — |
| b | — | 15 | — | 40 | — | 15 | — | 10 | — | — |
| c | — | — | — | — | — | — | — | — | 40 | — |
| d | — | — | — | — | — | — | — | — | — | 10 |
| Toluene | 500 | 500 | 500 | 500 | 300 | 300 | 500 | 500 | 500 | 500 |
| Methyl ethyl ketone | 700 | 700 | 700 | 700 | 400 | 400 | 700 | 700 | 700 | 700 |

The particle sizes of carbon black and zinc oxide used in the invention are as shown in Tables 2 (1) and (2).

TABLE 2 (1)

| Carbon black | Average primary (m$\mu$) particle size |
|---|---|
| A | 27 |
| B | 30 |
| C | 38 |
| D | 17 |
| E | 60 |

TABLE 2 (2)

| Zinc oxide | Average particle size ($\mu$m) |
|---|---|
| a | 0.6 |
| b | 0.9 |
| c | 0.3 |
| d | 1.5 |

Methods of measurement for the samples of Examples and Comparisons a) RE output, skew and jitter value: the tape was loaded into a VHS cassette and subjected to a repeated traveling test of 200 passes at 20° C., 60% RH, using an NV-6200 deck (manufactured by Matsushita Electric Industrial Co., Ltd.). RF output variation, skew value and jitter value were then measured. b) The tape damages and back coating layer scratches were visually evaluated on a tape after 200 passes traveling. c) Dynamic friction coefficient: was determined from the following equation (2) by measuring an outlet tension one minute later after allowing a sample tape to travel at 3.3 cm/second wherein the tape d) Interlayer friction coefficient: was determined from the equation (2) in the same manner as c), besides that a sample tape was wound around a stainless dome of a 62 mm diameter with a magnetic layer upside and the tape travelled at 0.2 cm/second.

e) Surface roughness Ra ($\mu$m): was determined by measuring sample surface in a length of 2.5 mm with a three dimensional roughness meter SE-3FK (Kosaka Kenkyusho) at a cut-off of 0.25 and needle pressure of 30 mg.

f) Chroma S/N: was determined by measuring noise voltage in reproducing 4.5 MHz signal recorded at the maximum recording current, using HR-7100 (Japan Victor Co., Ltd.).

g) Interlayer adhesion test: was inspected in winding off a sample tape of ½ inch width, which was wound with a tension of 1 kg and left at a room temperature for 24 hours after being left at 60° C. and RH80% for 24 hours.

h) Skew was determined by measuring an image distortion in $\mu$ second on a monitor display in switching, wherein a sample tape recording color-bar signals was tested after travelling 200 times at 40° C. and RH80% using a video deck HR-6500 made by Japan Victor Co., Ltd.

i) Jitter: was measured with a VTR jitter meter using a sample tape subjected to travelling 200 times.

The properties and evaluation results of the samples of Examples and Comparisons are summarized in Table 3.

TABLE 3

BC: a back coating layer.

| | | 200 passes tape | | | | | | Virgin tape | | | | |
|---|---|---|---|---|---|---|---|---|---|---|---|---|
| | | Output variation range (dB) | BC scratche | Tape damage | BC dynamic friction coefficient | Interlayer friction coefficient | Skew (μs) | Jitter (μs) | BC dynamic friction coefficient | Interlayer friction coefficient | Interlayer adhesion | BC surface roughness (Ra) μm | Chroma S/N (dB) |
| Example | 1 | 0.3 | None | None | 0.18 | 0.25 | 0.3 | 0.06 | 0.17 | 0.25 | None | 0.016 | +0.3 |
| | 2 | 0.2 | None | None | 0.19 | 0.24 | 0.2 | 0.06 | 0.17 | 0.23 | None | 0.018 | +0.2 |
| | 3 | 0.2 | None | None | 0.20 | 0.27 | 0.2 | 0.07 | 0.18 | 0.25 | None | 0.014 | +0.2 |
| | 4 | 0.3 | Virtually none | None | 0.20 | 0.26 | 0.3 | 0.06 | 0.18 | 0.24 | None | 0.021 | +0.1 |
| | 5 | 0.2 | Virtually none | None | 0.18 | 0.24 | 0.3 | 0.06 | 0.16 | 0.23 | None | 0.023 | +0.1 |
| | 6 | 0.4 | Virtually none | None | 0.19 | 0.24 | 0.2 | 0.07 | 0.16 | 0.23 | None | 0.018 | ±0.2 |
| Comparison | 1 | 0.3 | Virtually none | Rather many | 0.23 | 0.30 | 0.6 | 0.09 | 0.19 | 0.27 | None | 0.025 | ±0.0 |
| | 2 | 0.6 | Rather many | Rather many | 0.26 | 0.31 | 0.8 | 0.10 | 0.21 | 0.26 | A little | 0.011 | +0.1 |
| | 3 | 0.8 | Many | Many | 0.29 | 0.35 | 1.0 | 0.09 | 0.22 | 0.25 | A little | 0.012 | +0.1 |
| | 4 | 0.5 | Rather many | Rather many | 0.24 | 0.33 | 0.8 | 0.08 | 0.19 | 0.28 | None | 0.032 | −0.3 |

EXAMPLES 7 TO 13 AND COMPARISONS 5 to 9

A magnetic paint with the same composition as Example 1 was prepared in the same manner as Example 1 and coated on a polyethylene terephthalate support of 13 μm in thickness to form a magnetic layer having dry thickness of 4.5 μm, which was then subjected to supercalender treatment.

The compositions (back coating paints) shown in Table 4 were processed in the same manner as Example 1 and coated on a back side of the preceding support and dried to form a back coating layer having thickness of 1.0 μm, and the tape samples of Examples 7 to 13 and Comparisons 5 to 9 were obtained.

The particle sizes of carbon black are shown in Table 5. The particle sizes of zinc oxide are the same as Example 1.

TABLE 5

| Carbon black | Average primary (mμ) particle size |
|---|---|
| A | 27 |
| B | 38 |
| C | 280 |
| D | 350 |
| E | 17 |
| F | 60 |

The properties and evaluation results of the preceding samples are summarized in Table 6.

TABLE 4

Composition (back coating paint) (unit: parts by weight)

| Composition | Example | | | | | | | Comparison | | | | |
|---|---|---|---|---|---|---|---|---|---|---|---|---|
| | 7 | 8 | 9 | 10 | 11 | 12 | 13 | 5 | 6 | 7 | 8 | 9 |
| Polyurethane resin (Nipporan 2304, produced by Nippon Polyurethane Industry Co., Ltd.) | 40 | 40 | 50 | 50 | 50 | 25 | 70 | 40 | 40 | 50 | 50 | 50 |
| Nitrocellulose (Cellunova, produced by Asahi Chemical Industry Co., Ltd.) | 60 | 60 | 50 | 50 | 50 | 70 | 25 | 60 | 60 | 50 | 50 | 50 |
| Polyisocyanate (Coronate L, produced by Nippon Polyurethane Industry Co., Ltd.) | 20 | 20 | 20 | 20 | 20 | 25 | 25 | 20 | 20 | 20 | 20 | 20 |
| Carbon black | | | | | | | | | | | | |
| A | 75 | — | 90 | — | 80 | 80 | — | — | — | — | 100 | 100 |
| B | — | 80 | — | 65 | — | — | 80 | — | — | — | — | — |
| C | 20 | — | 20 | — | — | — | — | — | — | — | 20 | — |
| D | — | 25 | — | 15 | 20 | 15 | 25 | — | — | — | — | — |
| E | — | — | — | — | — | — | — | 120 | — | 100 | — | — |
| F | — | — | — | — | — | — | — | — | 100 | — | — | — |
| Zinc oxide | | | | | | | | | | | | |
| a | 25 | — | 10 | — | 20 | 25 | — | — | 20 | 20 | — | — |
| b | — | 15 | — | 40 | — | — | 15 | — | — | — | — | — |
| c | — | — | — | — | — | — | — | — | — | — | — | — |
| d | — | — | — | — | — | — | — | — | — | — | — | 20 |
| Toluene | 500 | 500 | 500 | 500 | 500 | 500 | 500 | 500 | 500 | 500 | 500 | 500 |
| Methyl ethyl ketone | 700 | 700 | 700 | 700 | 700 | 400 | 700 | 700 | 700 | 700 | 700 | 700 |

TABLE 6

BC: a back coating layer.

| | | 200 passes tape | | | | | | Virgin tape | | | | |
|---|---|---|---|---|---|---|---|---|---|---|---|---|
| | | Output variation range (dB) | BC scratche | Tape damage | BC dynamic friction coefficient | Inter-layer friction coefficient | Skew (μs) | Jitter (μs) | BC dynamic friction coefficient | Inter-layer friction coefficient | Inter-layer adhesion | BC surface roughness (Ra) | Chroma S/N (dB) |
| Example | 7 | 0.3 | None | None | 0.23 | 0.28 | 0.6 | 0.06 | 0.16 | 0.23 | None | 0.016 | +0.3 |
| | 8 | 0.4 | Virtually None | None | 0.21 | 0.26 | 0.4 | 0.05 | 0.18 | 0.23 | None | 0.018 | +0.2 |
| | 9 | 0.2 | Virtually None | Virtually None | 0.20 | 0.27 | 0.4 | 0.06 | 0.18 | 0.23 | None | 0.015 | +0.2 |
| | 10 | 0.3 | None | None | 0.24 | 0.29 | 0.5 | 0.06 | 0.19 | 0.24 | None | 0.018 | +0.1 |
| | 11 | 0.4 | None | None | 0.23 | 0.28 | 0.5 | 0.06 | 0.17 | 0.22 | None | 0.017 | +0.3 |
| | 12 | 0.3 | Virtually none | None | 0.22 | 0.25 | 0.4 | 0.05 | 0.20 | 0.23 | None | 0.022 | +0.2 |
| | 13 | 0.2 | None | None | 0.23 | 0.26 | 0.3 | 0.06 | 0.17 | 0.22 | None | 0.019 | +0.2 |
| Comparison | 5 | 1.1 | Many many | Rather | 0.24 | 0.34 | 0.9 | 0.09 | 0.20 | 0.23 | None | 0.013 | −0.1 |
| | 6 | 0.5 | Rather many | Many | 0.32 | 0.37 | 1.2 | 0.08 | 0.20 | 0.24 | A little | 0.020 | ±0.0 |
| | 7 | 0.4 | Rather many | Rather many | 0.29 | 0.35 | 0.8 | 0.10 | 0.19 | 0.23 | None | 0.011 | ±0.1 |
| | 8 | 0.9 | Many | Many | 0.30 | 0.38 | 0.9 | 0.11 | 0.19 | 0.25 | A little | 0.021 | +0.1 |
| | 9 | 0.8 | Rather many | Rather many | 0.29 | 0.35 | 1.0 | 0.07 | 0.21 | 0.24 | None | 0.035 | −0.6 |

EXAMPLES 14 TO 19 AND COMPARISONS 10 to 13

A magnetic paint with the same composition as Example 1 was prepared in the same manner as Example 1 and coated on a polyethylene terephthalate support of 13 μm thickness to form a magnetic layer having dry thickness of 4.5 μm, which was then subjected to supercalender treatment.

The compositions (back coating paints) shown in Table 6 were processed in the same manner as Example 1 and coated on a back side of the support and dried to form a back coating layer having dry thickness of 1.0 μm, and the tape samples of Examples 14 to 19 and Comparisons 10 to 13 were obtained.

TABLE 7

Composition (back coating paint) (unit: parts by weight)

| | Example | | | | | | Comparison | | | |
|---|---|---|---|---|---|---|---|---|---|---|
| Composition | 14 | 15 | 16 | 17 | 18 | 19 | 10 | 11 | 12 | 13 |
| Polyurethane resin (Nipporan 2304, produced by Nippon Polyurethane Industry Co., Ltd.) | 40 | 50 | 40 | 50 | 60 | 60 | 40 | 40 | 50 | 50 |
| Nitrocellulose (Cellunova, produced by Asahi Chemical Industry Co., Ltd.) | 60 | 50 | 60 | 50 | 40 | 40 | 60 | 60 | 50 | 50 |
| Polyisocyanate (Coronate L, produced by Nippon Polyurethane Industry Co., Ltd.) | 20 | 20 | 20 | 20 | 20 | 20 | 20 | 20 | 20 | 20 |
| Carbon black | | | | | | | | | | |
| A | 60 | — | 50 | — | 60 | — | — | — | — | 65 |
| B | — | 50 | — | 55 | — | 50 | 65 | — | 60 | — |
| C | — | — | — | — | — | — | — | — | — | — |
| D | — | — | — | — | — | — | — | 55 | — | — |
| E | 10 | 20 | 15 | 10 | 15 | 30 | — | 15 | 10 | 20 |
| Zinc oxide | | | | | | | | | | |
| e | 20 | 15 | 10 | 20 | 5 | 10 | 10 | 15 | — | 15 |
| f | — | — | — | — | — | — | — | — | — | — |
| g | — | — | — | — | — | — | — | — | 20 | — |
| Titanium oxide (Average particle diameter, 0.1 μm) | 10 | — | — | — | 20 | — | 25 | — | — | — |
| Barium sulfate (Average particle diameter, 0.2 μm) | — | 15 | — | — | — | — | 10 | — | 15 | — |
| Iron oxide (Average particle diameter, 0.1 μm) | — | — | 25 | — | — | — | — | — | — | — |
| Calcium carbonate (Average particle diameter, 0.05 μm) | — | — | — | 15 | — | — | — | — | — | — |
| Toluene | 300 | 300 | 300 | 300 | 300 | 300 | 300 | 300 | 300 | 300 |
| Methyl ethyl ketone | 500 | 500 | 500 | 500 | 500 | 500 | 500 | 500 | 500 | 500 |

The particle sizes of zinc oxide are shown in Table 8. The particle sizes of carbon black are the same as Example 1.

TABLE 8

| Zinc oxide | Average primary (μm) diameter |
|---|---|
| e | 0.6 |
| f | 0.1 |
| g | 1.5 |

The properties and evaluation results of the preceding samples are summarized in Table 9.

TABLE 9

| | | | 200 passes tape | | | | | Virgin tape | | | | |
|---|---|---|---|---|---|---|---|---|---|---|---|---|
| | | Output variation range (dB) | BC scratche | Tape damage | BC dynamic friction coefficient | Inter-layer friction coefficient | Skew (μs) | Jitter (μs) | BC dynamic friction coefficient | Inter-layer friction coefficient | Inter-layer adhesion | BC surface roughness (Ra) | Chroma S/N (dB) |
| Example | 14 | 0.3 | None | None | 0.21 | 0.25 | 5.0 | 0.05 | 0.18 | 0.23 | None | 0.018 | +0.3 |
| | 15 | 0.2 | None | None | 0.20 | 0.25 | 4.5 | 0.06 | 0.19 | 0.22 | None | 0.019 | +0.5 |
| | 16 | 0.4 | Virtually None | None | 0.21 | 0.26 | 3.2 | 0.05 | 0.18 | 0.22 | None | 0.016 | +0.2 |
| | 17 | 0.3 | None | Virtually None | 0.19 | 0.26 | 6.5 | 0.05 | 0.19 | 0.24 | None | 0.018 | +0.3 |
| | 18 | 0.2 | None | None | 0.19 | 0.26 | 3.5 | 0.06 | 0.18 | 0.23 | None | 0.023 | +0.5 |
| | 19 | 0.4 | Virtually none | None | 0.20 | 0.27 | 5.5 | 0.06 | 0.18 | 0.24 | None | 0.025 | +0.4 |
| Comparison | 10 | 0.6 | Rather many | Rather many | 0.26 | 0.35 | 13.5 | 0.08 | 0.19 | 0.25 | A little | 0.021 | −0.1 |
| | 11 | 0.8 | Many | Many | 0.25 | 0.32 | 9.5 | 0.12 | 0.20 | 0.27 | None | 0.013 | ±0 |
| | 12 | 0.5 | Many | Rather many | 0.30 | 0.33 | 7.2 | 0.11 | 0.21 | 0.26 | None | 0.029 | −0.3 |
| | 13 | 0.4 | Rather many | Many | 0.24 | 0.32 | 8.5 | 0.15 | 0.20 | 0.25 | A little | 0.024 | −0.2 |

EXAMPLES 20 TO 23 AND COMPARISONS 14 to 19

A magnetic paint with the same composition as Example 1 was prepared in the same manner as Example 1 and coated on a polyethylene terephthalate support of 13 μm thickness to form a magnetic layer having dry thickness of 4.5 μm, which was then subjected to supercalender treatment.

The compositions (back coating paints) shown in Table 10 were processed in the same manner as Example 1 and coated on a back side of the support and dried to form a back coating layer having dry thickness of 1.0 μm, and the tape samples of Examples 20 to 23 and Comparisons 14 to 19 were obtained.

TABLE 10

| | Composition (back coating paint) (unit: parts by weight) | | | | | | | | | |
|---|---|---|---|---|---|---|---|---|---|---|
| | Example | | | | Comparison | | | | | |
| Composition | 20 | 21 | 22 | 23 | 14 | 15 | 16 | 17 | 18 | 19 |
| Polyurethane resin (Nipporan 2304, produced by Nippon Polyurethane Industry Co., Ltd.) | 40 | 50 | 40 | 50 | 40 | 40 | 50 | 50 | 60 | 60 |
| Nitrocellulose (Cellunova, produced by Asahi Chemical Industry Co., Ltd.) | 60 | 50 | 60 | 50 | 60 | 60 | 50 | 50 | 40 | 40 |
| Polyisocyanate (Coronate L, produced by Nippon Polyurethane Industry Co., Ltd.) | 20 | 20 | 20 | 20 | 20 | 20 | 20 | 20 | 20 | 20 |
| Carbon black | | | | | | | | | | |
| A | 50 | 35 | 50 | 65 | — | 70 | 60 | 65 | 60 | 55 |
| B | 10 | 20 | 10 | 20 | 10 | 15 | 20 | — | 20 | 20 |
| C | 20 | 30 | 10 | 10 | 20 | — | 20 | 15 | 10 | 10 |
| D | — | — | — | — | 50 | — | — | — | — | — |
| Zinc Oxide | | | | | | | | | | |
| h | — | — | — | — | — | — | — | — | — | 15 |
| i | 20 | 15 | 30 | 5 | 20 | 15 | — | 20 | — | — |
| j | — | — | — | — | — | — | — | — | 10 | — |
| Toluene | 300 | 300 | 300 | 300 | 300 | 300 | 300 | 300 | 300 | 300 |
| Methyl ethyl ketone | 500 | 500 | 500 | 500 | 500 | 500 | 500 | 500 | 500 | 500 |

The particle sizes of the carbon black and zinc oxide are shown in Tables 11 (1) and (2).

TABLE 11 (1)

| Carbon black | Average primary particle size (mμ) |
|---|---|
| A | 27 |
| B | 60 |
| C | 350 |
| D | 17 |

TABLE 12 (2)

| Zinc oxide | Average particle size (μm) |
|---|---|
| h | 0.2 |
| i | 0.6 |
| j | 1.5 |

The properties and evaluation results of the preceding samples are summarized in Table 12.

TABLE 12

| | | | | 200 passes tape | | | | | Virgin tape | | | | |
|---|---|---|---|---|---|---|---|---|---|---|---|---|---|
| | | | | | | | | | BC: a back coating layer. | | | | |
| | | Output variation range (dB) | BC scratche | Tape damage | BC dynamic friction coefficient | Inter-layer friction coefficient | Skew (μs) | Jitter (μs) | BC dynamic friction coefficient | Inter-layer friction coefficient | Inter-layer adhesion | BC surface roughness (Ra) | Chroma S/N (dB) |
| Example | 20 | 0.3 | None | None | 0.21 | 0.26 | 0.6 | 0.06 | 0.18 | 0.25 | None | 0.018 | +0.3 |
| | 21 | 0.2 | None | None | 0.19 | 0.26 | 0.4 | 0.05 | 0.18 | 0.24 | None | 0.021 | +0.2 |
| | 22 | 0.3 | None | None | 0.19 | 0.27 | 0..5 | 0.05 | 0.17 | 0.24 | None | 0.022 | +0.1 |
| | 23 | 0.4 | Virtually None | None | 0.22 | 0.27 | 0.7 | 0.05 | 0.18 | 0.26 | None | 0.016 | +0.5 |
| Comparison | 14 | 0.5 | Rather many | Rather many | 0.27 | 0.33 | 1.2 | 0.08 | 0.19 | 0.27 | A little | 0.013 | +0.4 |
| | 15 | 0.8 | Many | Many | 0.29 | 0.35 | 2.0 | 0.09 | 0.20 | 0.29 | None | 0.015 | +0.3 |
| | 16 | 0.9 | Many | Many | 0.26 | 0.32 | 1.1 | 0.10 | 0.21 | 0.27 | None | 0.018 | +0.3 |
| | 17 | 0.3 | Rather many | Virtually none | 0.24 | 0.31 | 1.1 | 0.10 | 0.20 | 0.28 | None | 0.018 | +0.1 |
| | 18 | 0.5 | Virtually none | Rather many | 0.29 | 0.31 | 0.5 | 0.06 | 0.18 | 0.29 | None | 0.032 | −0.4 |
| | 19 | 0.7 | Many | Rather many | 0.26 | 0.35 | 2.3 | 0.09 | 0.19 | 0.28 | A little | 0.013 | +0.4 |

[Effect of the invention]

Examples 1 to 23, where carbon black, zinc oxide and an inorganic particle of the invention are incorporated, exhibit lower friction coefficients after subjected to 200 passes, and more excellent performances in BC scratch and tape damage than Comparisons. Skew and jitter of Examples are superior, which is attributable to stable travelling of the tapes of the invention. Further, surface roughness can be very fine and uniform in the invention because of excellent dispersability of the additives, which ensures no degradation of chroma S/N and improved durability in repeated use. Meantime, Comparisons 1 to 19 containing no carbon black, zinc oxide and an inorganic particle of the invention exhibit higher friction coefficient and less stable travelling than Examples, which results in inferior skew and jitter. Further, Comparisons are poorer also in chroma S/N, tape damage and BC scratch.

[Summary]

As having been clearly found from Examples, the magnetic recording medium of the invention has been proved to provide more stable travelling properties attributable to less dynamic friction coefficient, less tape damage/BC scratch in repeated use and more excellent electromagnetic conversion properties.

What is claimed is:

1. A method of producing a magnetic recording medium having a support, a magnetic layer on a first side of said support, a backcoating layer on a second side of said support, said backcoating layer containing a binder and a non-magnetic powder consisting essentially of a combination of a first carbon black having an average primary particle size of 20 to 40 mμ and zinc oxide having an average particle size of 0.5 to 2.0 μm, a ratio of an amount of said zinc oxide to carbon black being 0.01 to 2.0, and an amount of total filler, including said zinc oxide and said carbon black, being 50 to 500 parts by weight per 100 parts by weight of said binder.

2. The method of claim 1, wherein thickness of said back coating layer is 0.1 to 2.0 μm.

3. The method of claim 2, wherein the thickness is 0.2 to 1.5 μm.

4. The method of claim 1, wherein an addition ratio of the non-magnetic powder is 50 to 500 weight parts per 100 weight parts of the binder.

5. The method of claim 4, wherein the addition ratio is 60 to 400 weight parts per 100 weight parts of the binder.

6. The method of claim 1, wherein an addition ratio of zinc oxide is 1 to 200 weight parts per 100 weight parts of carbon black.

7. The method of claim 6, wherein the addition ratio is 5 to 100 weight parts per 100 weight parts of carbon black.

8. The method of claim 1, wherein the binder for the back coating layer comprises a combination of a polyurethane resin and a cellulose resin.

9. The method of claim 8, wherein a composition ratio of the polyurethane resin to the cellulose resin is 0.05 to 10.0.

10. The method of claim 9, wherein the composition ratio is 0.1 to 5.0.

11. The method of claim 8, wherein the binder contains polyisocyanate as a hardener.

12. The method of claim 11, wherein an addition ratio of polyisocyanate to the binder is 0.05 to 0.7.

13. The method of claim 12, wherein the addition ratio is 0.1 to 0.5.

14. The method of claim 1 wherein said non-magnetic powder further comprises a second carbon black having an average primary particle size of 100 to 500 mμ.

15. The method of claim 14 wherein said non-magnetic powder further comprises non-magnetic particles selected from the group consisting of titanium oxide, barium sulfate, ferric oxide, and calcium carbonate, said non-magnetic particles having an average particle size of 0.01 to 1.0 μm.

16. The method of claim 14 wherein said non-magnetic powder further comprises a third carbon black having an average primary particle size of 50 to 80 mμ.

17. A magnetic recording medium comprising a support, a magnetic layer on a first side thereof, a backcoating layer on a second side thereof, said backcoating layer containing a binder and a non-magnetic powder, wherein said non-magnetic powder consists essentially of a combination of a first carbon black having an average primary particle size of 20 to 40 mμ, and zinc oxide having an average particle size of 0.5 to 2.0 μm, wherein a ratio of an amount of said zinc oxide to carbon black is 0.1 to 2.0, and an amount of total filler, including said zinc oxide and said carbon black, is 50 to 500 parts by weight per 100 parts by weight of said binder.

18. The medium of claim 17, wherein thickness of said back coating layer is 0.1 to 2.0 μm.

19. The medium of claim 18, wherein the thickness is 0.2 to 1.5 μm.

20. The medium of claim 17, wherein an addition ratio of the non-magnetic powder is 50 to 500 weight parts per 100 weight parts of the binder.

21. The medium of claim 20, wherein the addition ratio is 60 to 400 weight parts per 100 weight parts of the binder.

22. The medium of claim 17, wherein an addition ratio of zinc oxide is 1 to 200 weight parts per 100 parts of carbon black.

23. The medium of claim 22, wherein the addition ratio is 5 to 100 weight parts per 100 weight parts of carbon back.

24. The medium of claim 17, wherein the binder for the back coating layer comprises a combination of a polyurethane resin and a cellulose resin.

25. The medium of claim 24, wherein a composition ratio of the polyurethane resin to the cellulose resin is 0.05 to 10.0.

26. The medium of claim 25, wherein the composition ratio is 0.1 to 5.0.

27. The medium of claim 24, wherein the binder contains polyisocyanate as a hardener.

28. The medium of claim 27, wherein an addition ratio of polyisocyanate to the binder is 0.05 to 0.7.

29. The medium of claim 28, wherein the addition ratio is 0.1 to 0.5.

30. The medium of claim 17, wherein said non-magnetic powder further contains a second carbon black having an average primary particle size of 100 to 500 mμ.

31. The medium of claim 30 wherein said non-magnetic powder further comprises a non-magnetic particle selected from the group consisting of titanium oxide, barium sulfate, ferric oxide, and calcium carbonate, said non-magnetic particle having an average particle size of 0.01 to 1.0 μm.

32. The medium of claim 30, wherein said non-magnetic powder further comprises a third carbon black having an average primary particle size of 50 to 80 mμ.

* * * * *